(12) United States Patent
Liu

(10) Patent No.: US 7,380,254 B2
(45) Date of Patent: May 27, 2008

(54) OPTICAL PICK-UP FEEDING DEVICE WITH BUFFER

(75) Inventor: Hong-Jen Liu, Tu-chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 598 days.

(21) Appl. No.: 10/871,200

(22) Filed: Jun. 18, 2004

(65) Prior Publication Data

US 2004/0268372 A1 Dec. 30, 2004

(30) Foreign Application Priority Data

Jun. 18, 2003 (CN) .............................. 03 2 47586

(51) Int. Cl.
*G11B 7/08* (2006.01)
(52) U.S. Cl. ..................................... 720/679
(58) Field of Classification Search ................ 720/679, 720/658, 659, 661, 662, 675, 677, 672; 369/223
See application file for complete search history.

(56) References Cited

U.S. PATENT DOCUMENTS

| 6,058,098 A * | 5/2000 | Kato | 720/663 |
| 6,445,673 B2 * | 9/2002 | Park | 720/675 |
| 6,724,714 B1 * | 4/2004 | Kato et al. | 720/672 |
| 6,922,841 B2 * | 7/2005 | Lee et al. | 720/677 |
| 6,947,369 B2 * | 9/2005 | Liao | 369/223 |
| 2003/0012118 A1 * | 1/2003 | Su et al. | 369/223 |

* cited by examiner

Primary Examiner—Tianjie Chen
(74) Attorney, Agent, or Firm—Wei Te Chung

(57) ABSTRACT

An optical pick-up feeding device (100) includes a bracket (1) defining an opening (10), a carrier (41) supporting an optical pick-up (3), a stepping motor (42) having a worm screw (420) for driving the carrier, a pair of guide rails (43) for guiding the carrier, and a connecting body (44) for transmitting driving force from the worm screw to the carrier. A slot (446) and a beam (447) are defined at a front end of the connecting body. A protrusion (445) extends horizontally outwardly from a middle of the beam. The protrusion can elastically bend into the slot when a force is applied on the protrusion. When the protrusion collides with an inside wall of the bracket at the opening, the protrusion presses the beam to bend into the slot, thereby translating the force of the collision into elastic deformation force of the beam. This reduces vibration of the optical pick-up.

11 Claims, 3 Drawing Sheets

OPTICAL PICK-UP FEEDING DEVICE WITH BUFFER

BACKGROUND OF THE INVENTION

1. Field of the Invention

The present invention generally relates to an optical recording/reproducing apparatus, and more particularly to an optical pick-up feeding device which can smoothly and steadily move an optical pick-up along a radial direction of an optical disc.

2. Description of Related Art

A Digital Versatile Disc (DVD) such as an optical disc can record or reproduce information in the form of electronic data to or from concentric tracks of the optical disc. The optical disc is loaded on a turntable by a disc loading device, and is then rotated by a rotating device. During rotation, an optical pick-up device travels along a radial direction of the optical disc and projects a laser beam onto a track of the disc. The information is thus recorded or reproduced to or from the optical disc.

A typical optical pick-up feeding device for feeding an optical pick-up is shown in U.S. Pat. No. 6,445,673. The optical pick-up feeding device comprises a bracket, with an opening being defined in a center of the bracket. A pair of guide shafts are mounted at opposite sides of the opening respectively. A carrier supporting an optical pick-up is movably mounted on the guide shafts. A stepping motor is mounted on the bracket. The stepping motor has a worm screw, which is parallel with the guide shafts. The stepping motor drives the worm screw, which causes the carrier to move along the guide shafts. The optical pick-up can thus direct its laser beam to a correct track of an optical disc.

The carrier needs to move fast, in order to carry the optical pick-up to a position where the laser beam can search for and aim on a particular track according to a command input from a user. When the carrier moves to an inmost track or an outmost track, the carrier maybe collide with other parts of the optical pick-up feeding device such as a wall bounding the opening or an opposite spindle motor. The optical pick-up is a highly precise device, and even a slight collision can hinder the laser beam from finding the correct track. This typically leads to delays in receiving the information from the optical disc.

SUMMARY OF THE INVENTION

Accordingly, an object of the present invention is to provide an optical pick-up feeding device which can protect an optical pick-up thereof from the effects of collision.

In order to achieve the object set out above, an optical pick-up feeding device of the present invention includes a bracket defining an opening, a carrier supporting an optical pick-up, a stepping motor having a worm screw for driving the carrier to move, a pair of guide rails for guiding the carrier to move, and a connecting body for transmitting driving force from the worm screw to the carrier. A slot and a beam are defined at a front end of the connecting body. A protrusion extends horizontally outwardly from a middle of the beam. The protrusion can elastically bend into the slot when a force is applied on the protrusion. When the protrusion collides with an inside wall of the bracket at the opening, the protrusion presses the beam to bend into the slot, thereby translating the force of the collision into elastic deformation force of the beam. This reduces vibration of the optical pick-up.

Other objects, advantages and novel features of the present invention will become more apparent from the following detailed description when taken in conjunction with the accompanying drawings, in which:

DETAILED DESCRIPTION OF THE INVENTION

Figure 1:
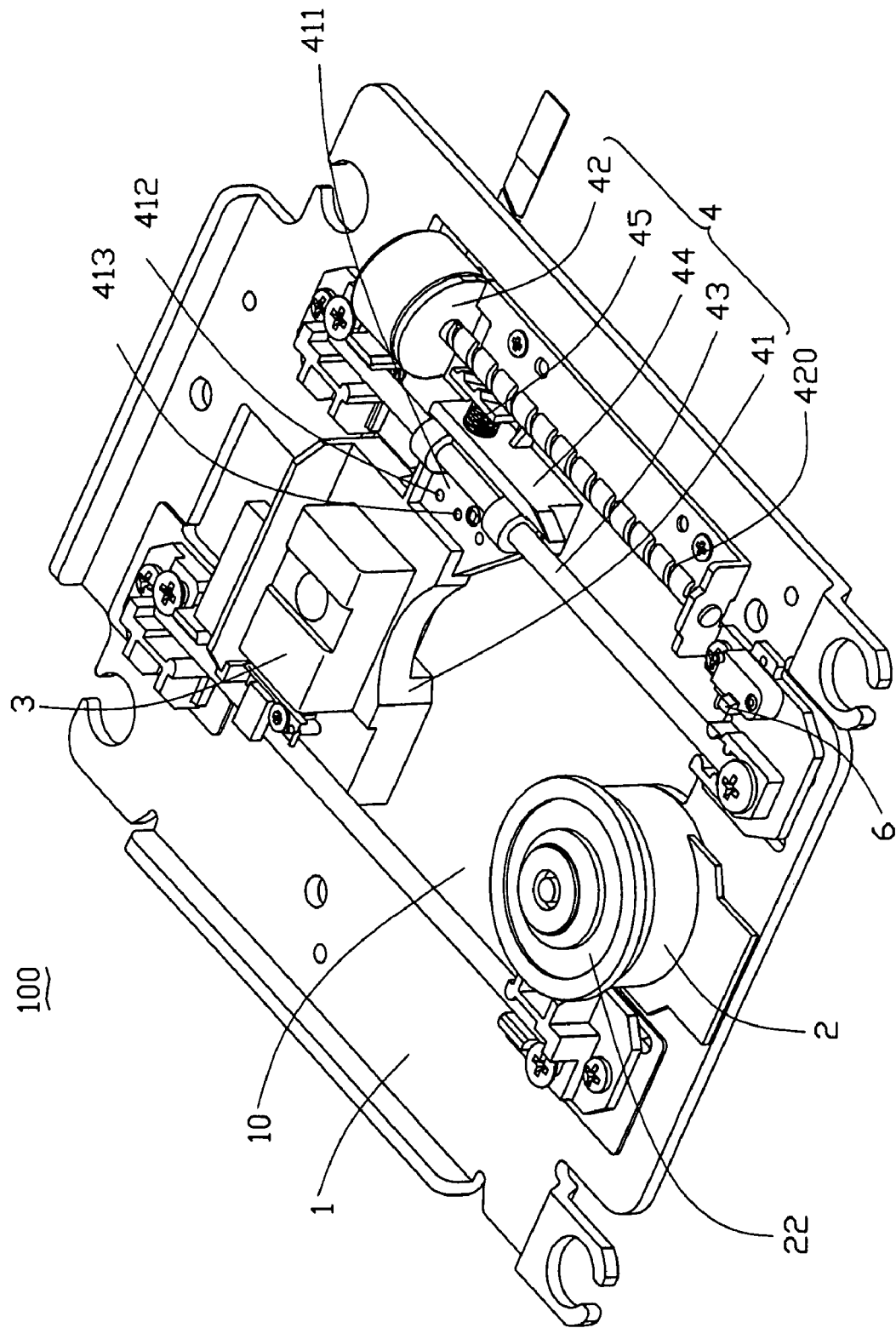
FIG. 1 is an isometric view of an optical pick-up feeding device in accordance with the present invention.

Reference will now be made to the drawing figures to describe the preferred embodiment of the present invention in detail.

Figure 2:
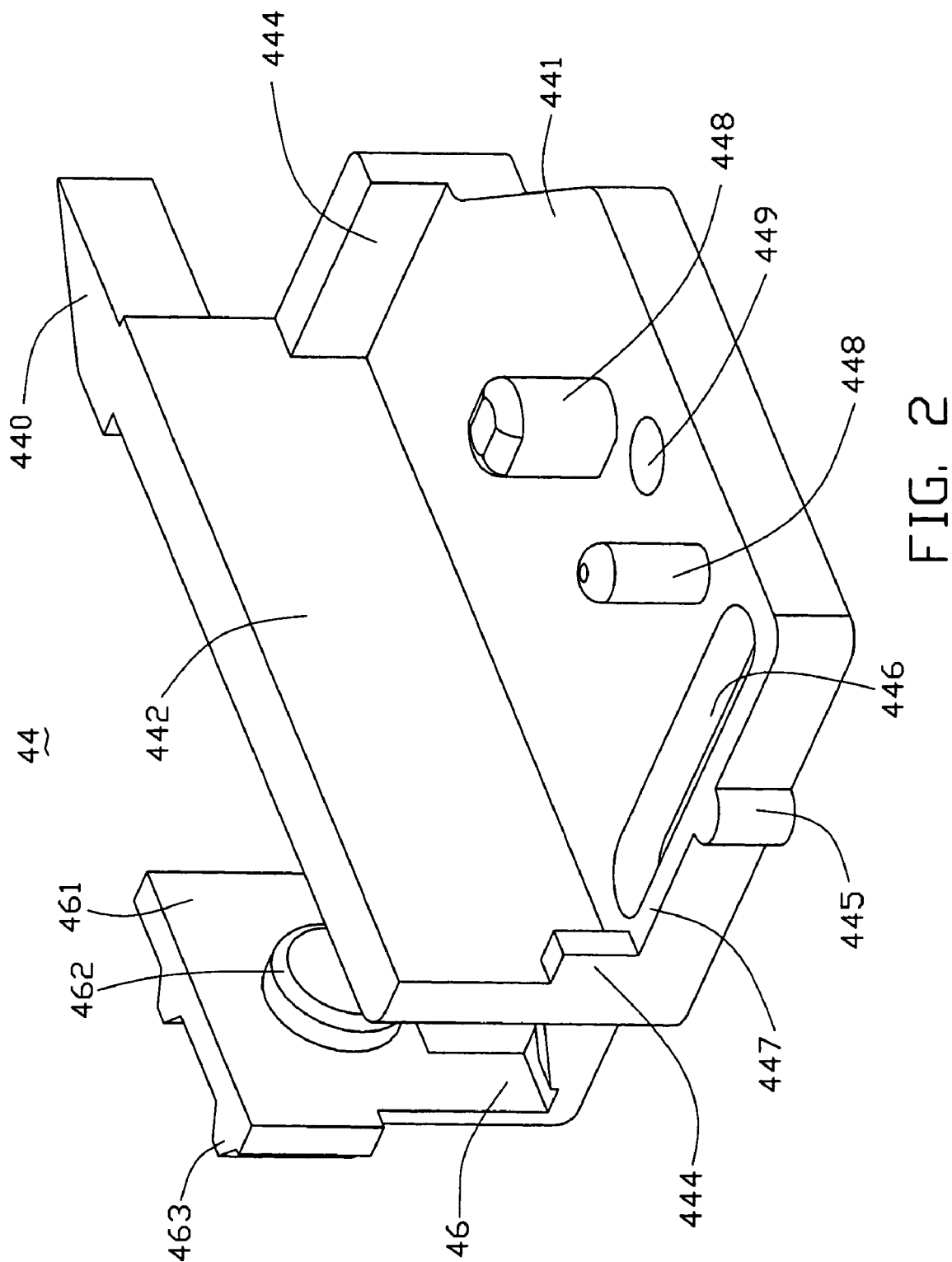
FIG. 2 is an enlarged view of a connecting body of the optical pick-up feeding device of FIG. 1, but viewed from another aspect.
Figure 3:
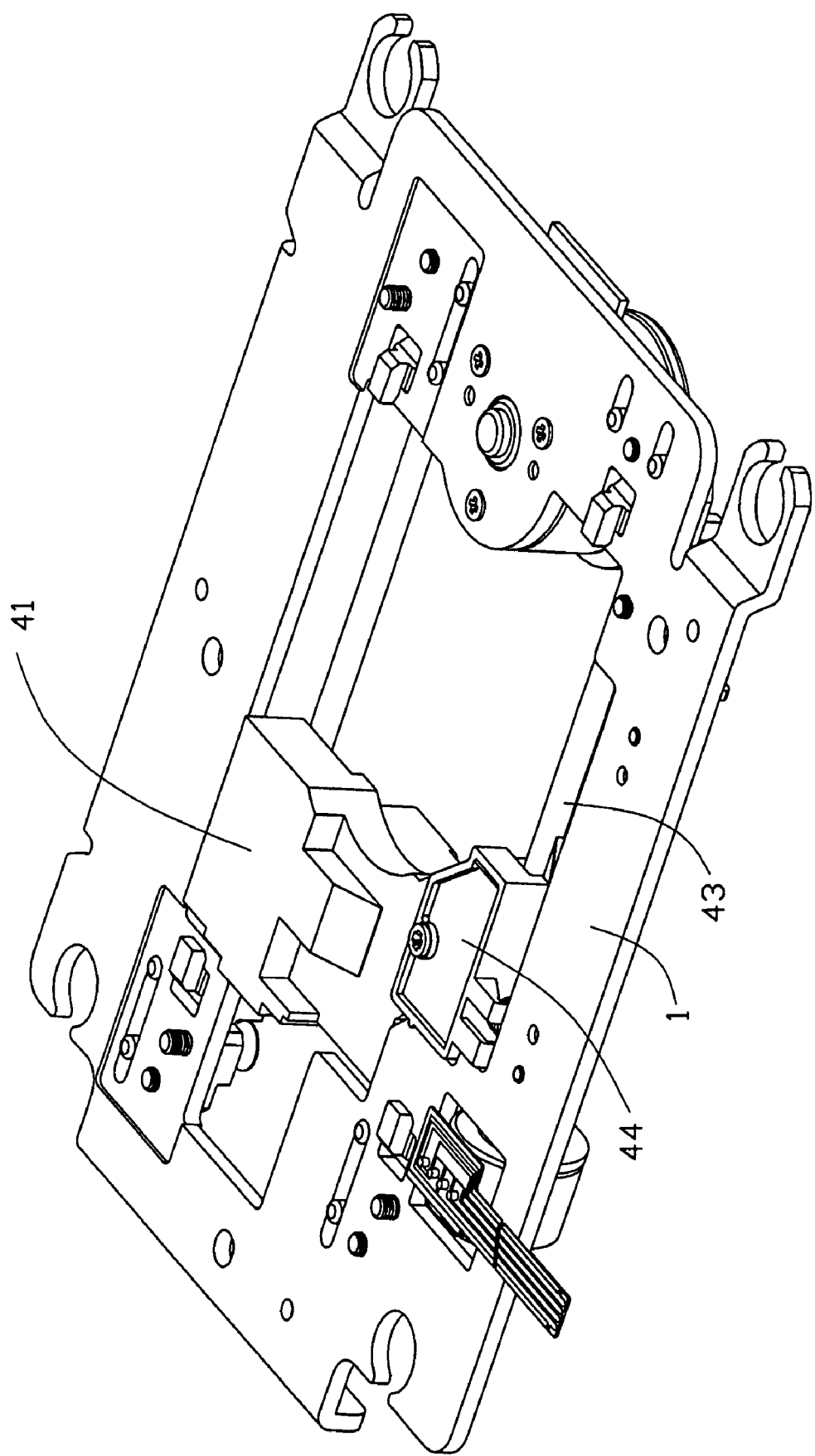
FIG. 3 is an inverted view of FIG. 1.

As shown in FIGS. 1-2, an optical pick-up feeding device 100 in accordance with a preferred embodiment of the present invention includes a bracket 1, a spindle motor 2, an optical pick-up 3, a feeding apparatus 4 and an electronic switch 6. An opening 10 is defined in a center of the bracket 1. The spindle motor 2 has a turntable 22 thereon, and is adjacent a lateral side of the opening 10. An optical disc (not shown) can be attached on the turntable 22, whereupon the spindle motor 2 can drive the turntable 22 to rotate the optical disc. The feeding apparatus 4 comprises a carrier 41, a stepping motor 42, two guiding rails 43, a connecting body 44, and a spring 45. The guiding rails 43 are parallel with each other, and are adjustably mounted at opposite longitudinal sides of the opening 10 respectively. The optical pick-up 3 is mounted on the carrier 41. The carrier 41 is movably installed in the bracket 1 between the guiding rails 43. The carrier 41 comprises a mounting wall 411, which can cooperate with the connecting body 44. A mounting hole 413 and a pair of locating holes 412 are defined in the mounting wall 411. The stepping motor 42 comprises a worm screw 420. The stepping motor 42 is mounted on the bracket 1, such that the worm screw 420 is parallel with and spaced a certain distance from a nearest one of the guiding rails 43. A helical screw thread (not labeled) is formed on a surface of the worm screw 420.

The connecting body 44 is integrally formed, and comprises a first wall 441, a second wall 442 extending vertically upwardly from a longitudinal side of the first wall 441, a pair of third walls 444 extending vertically upwardly from opposite lateral sides of the first wall 441 respectively, and a connecting arm 46 extending out away from a longitudinal side of the second wall 442. A slot 446 is defined in the first wall 441 adjacent a front lateral side thereof. The slot 446 is perpendicular to the second wall 442. A semicylindrical protrusion 445 extends horizontally outwardly from the front lateral side of the first wall 441. A beam 447 of the first wall 441 is defined between the slot 446 and the protrusion 445. The beam 447 is relatively thin, so that it can elastically bend into the slot 446 when pressure is applied on the protrusion 445. That is, the protrusion 445 can buffer the pressure by way of the elastic deformation of the beam 447. A pair of locating posts 448 are formed on the first wall 441, to cooperate with the locating holes 412 of the carrier 41. A through hole 449 is defined in the first wall 441, to cooperate with the mounting hole 413 of the carrier 41. A tapered button 440 is formed at a rear end of the second wall 442. The tapered button 440 can control switching on and off of the electronic switch 6. If the electronic switch 6 is switched off, the optical pick-up 3 rests in a starting position relative to the optical disc.

The connecting arm 46 is generally L-shaped, and extends outwardly from a bottom of the second wall 442. The connecting arm 46 comprises a vertical fourth wall 461, which is parallel to the second wall 442. A pair of cylindrical projections 462 (only one visible) are respectively formed on mutually opposite main faces (not labeled) of the second wall 442 and the fourth wall 461. The spring 45 is mounted around the two cylindrical projections 462, and is compressed between the second wall 442 and the fourth wall 461. A pair of identical cams 463 are formed on an outer main face of the fourth wall 461. The cams 463 can engage with the screw thread (not labeled) of the worm screw 420.

Referring also to FIG. 2, in assembly, the spring 45 is clipped around the cylindrical projections 462 between the second wall 442 and the fourth wall 461 of the connecting body 44. The fourth wall 461 and the second wall 442 are manually squeezed together slightly, and the locating posts 448 and the through hole 449 are respectively aligned with the locating holes 412 and the mounting hole 413 of the mounting wall 411. The connecting body 44 is placed on the mounting wall 411, so that the fourth wall 461 and the second wall 442 are elastically engaged between the worm screw 420 and said nearest guiding rail 43. The cams 463 of the connecting arm 46 are engaged with the screw tread of the worm screw 420, with the spring 45 pressing the cams 463 in a groove (not labeled) defined by the screw tread. The cams 463 can thus be driven by the screw thread to move along the worm screw 420. The locating posts 448 are respectively received in the corresponding locating holes 412. A screw (not shown) is extended trough the through hole 449 and engaged in the mounting hole 413. The connecting body 44 is thus mounted in the optical pick-up feeding device 100. When the worm screw 420 is driven by the stepping motor 42, the connecting body 44 with the carrier 41 is guided by the screw thread to move back and forth along the guiding rails 43. The optical pick-up 3 can thus focus a laser beam on relevant tracks of the optical disc.

In operation, when the optical pick-up 3 initially moves to an outmost track of the optical disc, the protrusion 445 collides with an inside wall of the bracket 1 at the opening 10. The protrusion 445 presses the beam 447 to bend into the slot 446, thereby translating the force of the collision into elastic deformation force of the beam 447. This reduces vibration of the optical pick-up 3. That is, the structure of the connecting body 44 effectively reduces the effect of the collision on the optical pick-up 3. This enables the optical pick-up 3 to rapidly locate to the correct position where it can access the outmost track of the optical disc.

In accordance with an alternative embodiment of the present invention, the protrusion 445, the beam 447 and the slot 446 can be set at an inside wall of the bracket 1 at the opening 10. When the first wall 441 of the connecting body 44 collides with the protrusion 445, the beam 447 bends into the slot 446, thereby translating the force of the collision into elastic deformation force of the beam 447. This reduces the effect of the collision on the optical pick-up 3.

In accordance with further alternative embodiments of the present invention, any one or more of the protrusion 445, the beam 447 and the slot 446 can be replaced by means such as foam rubber, a spring or an elastic plate, any one or more of which can reduce the effect of said collision on the optical pick-up 3.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical pick-up feeding device comprising:
   a bracket defining an opening in a center thereof;
   a carrier supporting an optical pick-up thereon;
   a stepping motor with a worm screw for driving the carrier to move along the worm screw;
   two guiding rails provided at opposite sides of the opening;
   a connecting body comprising a first wall, a second wall extending upwardly from a longitudinal side of the first wall, and a connecting arm; and
   a buffer element comprising an elastic beam defined at a front end of the connecting body, a protrusion formed on one side of the elastic beam, and a slot defined at an inner side of the elastic beam, the beam being able to elastically deform so that it can bend into the slot, the protrusion extending outwardly from the beam;
   wherein the carrier is movably mounted between the guiding rails, the connecting body is mounted to the carrier and cooperates with the worm screw to transmit driving force from the stepping motor to the carrier, and the buffer element is configured for reducing vibration of the optical pick-up due to collision.

2. The optical pick-up feeding device as recited in claim 1, wherein the protrusion is generally semicylindrical.

3. The optical pick-up feeding device as recited in claim 2, wherein the buffer element is provided at the first wall of the connecting body.

4. The optical pick-up feeding device as recited in claim 2, wherein at least one locating post is formed on the first wall, and the carrier defines at least one locating hole, the locating bole receiving the locating post.

5. The optical pick-up feeding device as recited in claim 1, wherein the connecting body further comprises a pair of third walls that extend upwardly from opposite sides of the first wall.

6. The optical pick-up feeding device as recited in claim 1, wherein the connecting arm is generally L-shaped, and comprises a fourth wall that is parallel to the second wall.

7. The optical pick-up feeding device as recited in claim 6, wherein at least one cam is formed on an outer surface of the fourth wall, for engaging with the worm screw.

8. The optical pick-up feeding device as recited in claim 7, wherein a pair of opposing projections are respectively formed on an inner surface of the fourth wall and an outer surface of the second wall.

9. The optical pick-up feeding device as recited in claim 8, further comprising a spring sandwiched between the fourth wall and the second wall around the projections.

10. An optical pick-up feeding device, comprising:
    a bracket defining an opening in a center thereof;
    a carrier supporting an optical pick-up thereon;
    a stepping motor with a worm screw for driving the carrier to move along the worm screw;
    two guiding rails provided at opposite sides of the opening;
    a connecting body comprising a first wall, a second wall extending upwardly from a longitudinal side of the first wall, and a connecting arm; and a buffer element provided at an inside wall of the bracket at said side of the opening, the buffer element being configured for contacting the first wall of the connecting body;

wherein the carrier is movably mounted between the guiding rails, the connecting body is mounted to the carrier and cooperates with the worm screw to transmit driving force from the stepping motor to the carrier, and the buffer element is configured for reducing vibration of the optical pick-up due to collision.

11. An optical pick-up feeding device, comprising:

a bracket defining an opening in a center thereof;

a carrier supporting an optical pick-up thereon;

a stepping motor with a worm screw for driving the carrier to move along the worm screw;

two guiding rails provided at opposite sides of the opening; and a connecting body translating a driving force from the stepping motor to the carrier, a slot being defined in one side of the connecting body thereby defining a beam thereat, a protrusion extending along the worm screw from the beam, the protrusion being configured for detachably contacting an inside wall of the bracket at the opening;

wherein the carrier is movably mounted between the guiding rails, the connecting body is mounted to the carrier and cooperates with the worm screw to translate the driving force from the stepping motor to the carrier, and the beam is elastically deformable to bend into the slot in order to reduce vibration of the optical pick-up due to a collision generated between the connecting body and the inside wall.

* * * * *